US010718256B2

(12) United States Patent
Gonze et al.

(10) Patent No.: US 10,718,256 B2
(45) Date of Patent: Jul. 21, 2020

(54) POWERTRAIN THERMAL MANAGEMENT SYSTEM AND METHOD

(71) Applicant: GM Global Technology Operations LLC, Detroit, MI (US)

(72) Inventors: Eugene V. Gonze, Pinckney, MI (US); Irina N. Dmitrieva, Bloomfield Hills, MI (US); Michael J. Paratore, Jr., Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 515 days.

(21) Appl. No.: 15/145,417

(22) Filed: May 3, 2016

(65) Prior Publication Data
US 2017/0321594 A1 Nov. 9, 2017

(51) Int. Cl.
| | | |
|---|---|---|
| F01P 7/14 | (2006.01) |
| F01P 7/16 | (2006.01) |
| F16K 11/076 | (2006.01) |
| F01P 3/12 | (2006.01) |
| F01P 11/08 | (2006.01) |

(52) U.S. Cl.
CPC .................. *F01P 7/14* (2013.01); *F01P 3/12* (2013.01); *F01P 7/165* (2013.01); *F01P 11/08* (2013.01); *F16K 11/076* (2013.01); *F01P 2007/146* (2013.01)

(58) Field of Classification Search
CPC ...... F01P 7/14; F01P 3/12; F01P 7/165; F01P 11/08; F01P 2007/146; F16K 11/076
USPC ..................................................... 123/41.08
See application file for complete search history.

(56) References Cited

U.S. PATENT DOCUMENTS

| | | | | |
|---|---|---|---|---|
| 3,692,041 A * | 9/1972 | Bondi | ........................ | F02C 7/22 137/238 |
| 5,730,089 A * | 3/1998 | Morikawa | .......... | B60H 1/00885 123/41.14 |
| 5,809,944 A * | 9/1998 | Aoki | .................. | B60H 1/00878 123/41.02 |
| 5,896,833 A * | 4/1999 | Aoki | .................. | B60H 1/00878 123/41.14 |
| 6,539,899 B1* | 4/2003 | Piccirilli | ................. | F01P 7/167 123/41.08 |
| 6,616,059 B2* | 9/2003 | Sabhapathy | ............. | B60H 1/04 237/12.3 B |

(Continued)

FOREIGN PATENT DOCUMENTS

CN 104602927 A 5/2015

*Primary Examiner* — Hung Q Nguyen
*Assistant Examiner* — Anthony Donald Taylor, Jr.

(57) ABSTRACT

A vehicle powertrain thermal management system for distributing thermal energy to vehicle powertrain components, including an engine and a transmission. The system for managing heat energy includes a coolant pump, a first control valve, a second control valve, a radiator, a heater core, and a transmission oil heat exchanger. The first control valve has an inlet that is in fluid communication with the engine coolant outlet. The first control valve also has a first control valve outlet. The second control valve has a first inlet, a second inlet, a first outlet, a second outlet and a third outlet. Heat energy produced by the engine is transferred to the radiator through control of the first control valve and to at least one of the heater core, and the transmission oil heat exchanger through the control of the second control valve.

22 Claims, 3 Drawing Sheets

(56) References Cited

U.S. PATENT DOCUMENTS

| | | | | |
|---|---|---|---|---|
| 8,042,609 | B2* | 10/2011 | Samie | F16H 57/0412 165/202 |
| 8,978,596 | B2* | 3/2015 | Glassford | F01P 3/20 123/41.05 |
| 9,188,051 | B1* | 11/2015 | Zahdeh | F01N 5/02 |
| 9,222,571 | B2 | 12/2015 | Gonze et al. | |
| 9,796,244 | B2* | 10/2017 | Cook | B60H 1/04 |
| 9,827,824 | B2* | 11/2017 | Enomoto | B60H 1/00878 |
| 2011/0073285 | A1* | 3/2011 | Benoit | F01P 7/165 165/104.28 |
| 2011/0284200 | A1* | 11/2011 | Gooden | B60K 11/06 165/287 |
| 2011/0296855 | A1* | 12/2011 | Johnston | B60L 3/0046 62/79 |
| 2012/0180980 | A1* | 7/2012 | Malvicino | B60H 1/00385 165/42 |
| 2013/0276765 | A1* | 10/2013 | Moffat | F02M 25/07 123/568.12 |
| 2013/0305708 | A1* | 11/2013 | Zahdeh | F01P 3/20 60/599 |
| 2014/0261254 | A1* | 9/2014 | Gonze | F01P 11/08 123/41.08 |
| 2014/0374081 | A1* | 12/2014 | Kakehashi | B60K 11/02 165/202 |
| 2015/0101789 | A1* | 4/2015 | Enomoto | B60H 1/00485 165/202 |
| 2015/0129161 | A1* | 5/2015 | Nishikawa | B60K 11/02 165/43 |
| 2015/0217622 | A1* | 8/2015 | Enomoto | B60H 1/00878 165/42 |
| 2015/0273976 | A1* | 10/2015 | Enomoto | B60K 6/22 165/202 |
| 2016/0031288 | A1* | 2/2016 | Nishikawa | F01P 3/20 165/202 |
| 2016/0332505 | A1* | 11/2016 | Yamanaka | B60L 11/18 |
| 2017/0037770 | A1* | 2/2017 | Cook | F01P 7/165 |

* cited by examiner

POWERTRAIN THERMAL MANAGEMENT SYSTEM AND METHOD

FIELD

The present invention relates to coolant circuits for automobile powertrain systems, and more particularly to systems and methods for managing heat generated by an automotive engine to improve the overall efficiency of the powertrain.

BACKGROUND

The statements in this section merely provide background information related to the present disclosure and may or may not constitute prior art.

A typical powertrain of an automobile includes an engine and transmission. A coolant system is employed to prevent the engine from overheating. The coolant system includes a coolant pump that provides fluid, such as an engine coolant, to a plurality of engine and transmission components, including heat exchangers, via a plurality of fluid communication lines. Generally, heat is transferred from the engine to the coolant via a coolant jacket that surrounds the combustion-heated components of the engine. The heat absorbed by the circulated coolant is then generally used to carry thermal energy to and from the plurality of heat exchangers in order to achieve desired component operating temperature ranges. In conventional coolant systems, much of the thermal energy in the circulating coolant is dissipated to the air by a heat exchanger, such as a radiator, or heater core, and thereafter is lost to the system.

Under normal operating conditions, an engine and transmission may only require nominal coolant flow to maintain proper temperature of internal components. However, under severe operating conditions an engine requires increased coolant flow to maintain proper component temperatures. If a high flow rate coolant pump is used to provide a high coolant flow rate under severe conditions to prevent overheating, the amount of coolant flow will be excessive under normal operating conditions, resulting in parasitic energy losses within the engine and transmission. Under cold start conditions, an engine and transmission may also require increased coolant flow to achieve and maintain proper temperature of internal components.

While conventional coolant systems are effective, there is room in the art for a coolant circuit that has enhanced controllability and capability to utilize heat energy generated by an engine to improve the operating efficiency of the powertrain over a range of operating conditions.

SUMMARY

In an embodiment of the present invention, a system for managing heat energy in a vehicle powertrain is provided. The powertrain includes an engine and a transmission. The engine produces heat energy and has a series of coolant passageways including an engine coolant inlet and engine coolant outlet. The system for managing heat energy includes a coolant pump, a first control valve, a second control valve, a radiator, a heater core, and a transmission oil heat exchanger. The coolant pump supplies coolant to the engine via a pump inlet and a pump outlet, and the pump outlet is in fluid communication with the engine coolant inlet. The first control valve has an inlet that is in fluid communication with the engine coolant outlet. The first control valve also has a first control valve outlet. The radiator has a coolant inlet that is in fluid communication with the outlet of the first control valve. The radiator also has a radiator outlet in fluid communication with the pump inlet. The heater core has an inlet and an outlet. The outlet of the heater core is in fluid communication with the inlet of the pump. The transmission oil heat exchanger exchanges heat energy between the coolant and a transmission oil. The transmission oil lubricates and exchanges heat energy with the transmission. The transmission oil heat exchanger also has an inlet port as well as an outlet that is in fluid communication with the inlet port of the pump. The second control valve has a first inlet, a second inlet, a first outlet, a second outlet and a third outlet. The first inlet is in fluid communication with the engine coolant outlet, while the second inlet is in fluid communication with the pump outlet. The first outlet is in fluid communication with the heater core inlet, the second outlet is in fluid communication with the pump inlet, and the third outlet is in fluid communication with the inlet of the transmission oil heat exchanger. Heat energy produced by the engine is transferred to the radiator through control of the first control valve and to at least one of the heater core, and the transmission oil heat exchanger through the control of the second control valve.

In another embodiment of the present invention, the system includes an engine oil heat exchanger for exchanging heat energy between the coolant and the engine oil. The engine oil heat exchanger has an inlet in fluid communication with a fourth outlet of the second control valve.

In a further embodiment of the present invention, the first valve is a variable flow valve that is capable of increasing the amount of flow of the coolant from the inlet to the outlet.

In yet another embodiment of the present invention, the second control valve has a first operating state in which the second control valve directs coolant from the first inlet of the second control valve to the first and second outlets of the second control valve.

In still another embodiment of the present invention, the second control valve further has a second operating state in which the second control valve directs coolant from the first inlet of the second control valve to the first outlet of the second control valve.

In yet a further embodiment of the present invention, the second control valve has a third operating state, in which the second control valve directs coolant from the first inlet of the second control valve to the first and third outlets of the second control valve.

In another embodiment of the present invention, the second control valve has a fourth operating state in which the second control valve directs coolant from the first inlet of the second control valve to the first, second, and third outlets of the second control valve.

In still another embodiment of the present invention, the second control valve has a fifth operating state in which the second valve directs coolant from the first inlet and the second inlet of the second control valve to the third outlet of the second control valve.

In another embodiment of the present invention, the second control valve has a sixth operating state in which the second control valve directs coolant from the first and second inlets of the second control valve to the first outlet of the second control valve and the third outlet of the second control valve.

In a further embodiment of the present invention, the second control valve has a seventh operating state. In the seventh operating state, the second control valve directs coolant from the first and second inlets of the second control valve to the first, second, and third outlets of the second control valve.

In yet another embodiment of the present invention, the second control valve has an eighth operating state. In the eighth operating state, the second control valve directs coolant from the first and second inlets of the second control valve to the first, third, and fourth outlets of the second control valve.

In still another embodiment of the present invention, the second control valve has a ninth operating state. In the ninth operating state, the second control valve directs coolant from the second inlet of the second control valve to the third and fourth outlets of the second control valve.

In a further embodiment of the present invention, a method for managing heat energy in a vehicle powertrain is provided. The method includes producing heat energy in an engine of a powertrain, and distributing heat energy throughout a heat management system. The heat management system includes a coolant pump, a first control valve, a second control valve, a radiator, a heater core, and a transmission oil heat exchanger. The engine also has a series of coolant passageways including an engine coolant inlet and engine coolant outlet. Coolant is supplied to the engine using the pump, which has a pump inlet and a pump outlet. The pump outlet is in fluid communication with the engine inlet coolant. Coolant flow is controlled with the first control valve that has a first control valve inlet and a first control valve outlet. The first control valve inlet is in fluid communication with the engine coolant outlet. Heat energy is released from the coolant by passing the coolant through the radiator with a coolant inlet in fluid communication with the outlet of the first control valve and a radiator outlet, which is in fluid communication with the pump inlet. Heat energy is also released from the coolant by passing the coolant through the heater core, which has an inlet and an outlet. The outlet of the heater core is in fluid communication with the inlet of the pump. Heat energy is exchanged between the coolant and a transmission oil using the transmission oil heat exchanger. The transmission oil lubricates and exchanges heat energy with the transmission. The transmission oil heat exchanger has an inlet and an outlet in fluid communication with the inlet of the pump. Coolant flow is also controlled with the second control valve which has a first inlet, a second inlet, a first outlet, a second outlet and a third outlet. The first inlet is in fluid communication with the engine coolant outlet, and the second inlet is in fluid communication with the pump outlet. The first outlet of the second control valve is in fluid communication with the inlet of the heater core, the second outlet is in fluid communication with the pump inlet, and the third outlet is in fluid communication with inlet of the transmission oil heat exchanger. The heat energy produced by the engine is transferred to the radiator through control of the first control valve and to at least one of the heater core and the transmission oil heat exchanger through the control of the second control valve.

In still another embodiment of the present invention, heat energy is exchanged between the coolant and the engine oil using an engine oil heat exchanger. The engine oil heat exchanger has an inlet in fluid communication with a fourth outlet of the second control valve.

In another embodiment of the present invention, coolant flow is controlled by increasing the amount of flow of the coolant from the inlet to the outlet of the first valve using a variable flow valve.

In yet another embodiment of the present invention, coolant flow is controlled by directing coolant from the first inlet of the second control valve to the first and second outlets of the second control valve in a first operating state.

In still another embodiment of the present invention, coolant flow is controlled by directing coolant flow from the first inlet of the second control valve to the first outlet of the second control valve in a second operating state.

In a further embodiment of the present invention, coolant flow is controlled by directing coolant flow from the first inlet of the second control valve to the first and third outlets of the second control valve in a third operating state.

In still a further embodiment of the present invention, coolant flow is controlled by directing coolant flow from the first inlet of the second control valve to the first, second, and third outlets of the second control valve in a fourth operating state.

In yet a further embodiment of the present invention, coolant flow is controlled by directing coolant flow from the first inlet and the second inlet of the second control valve to the third outlet of the second control valve in a fifth operating state.

In another embodiment of the present invention, coolant flow is controlled by directing coolant flow from the first and second inlets of the second control valve to the first and third outlets of the second control valve in a sixth operating state.

In yet another embodiment of the present invention, coolant flow is controlled by directing coolant flow from the first and second inlets of the second control valve to the first, second, and third outlets of the second control valve in a seventh operating state.

In still another embodiment of the present invention, coolant flow is controlled by directing coolant flow from the first inlet and the second inlet of the second control valve to the first, third, and fourth outlets of the second control valve in an eighth operating state.

In yet another embodiment of the present invention, coolant flow is controlled by directing coolant flow from the second inlet of the second control valve to the third and fourth outlets of the second control valve in a ninth operating state.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
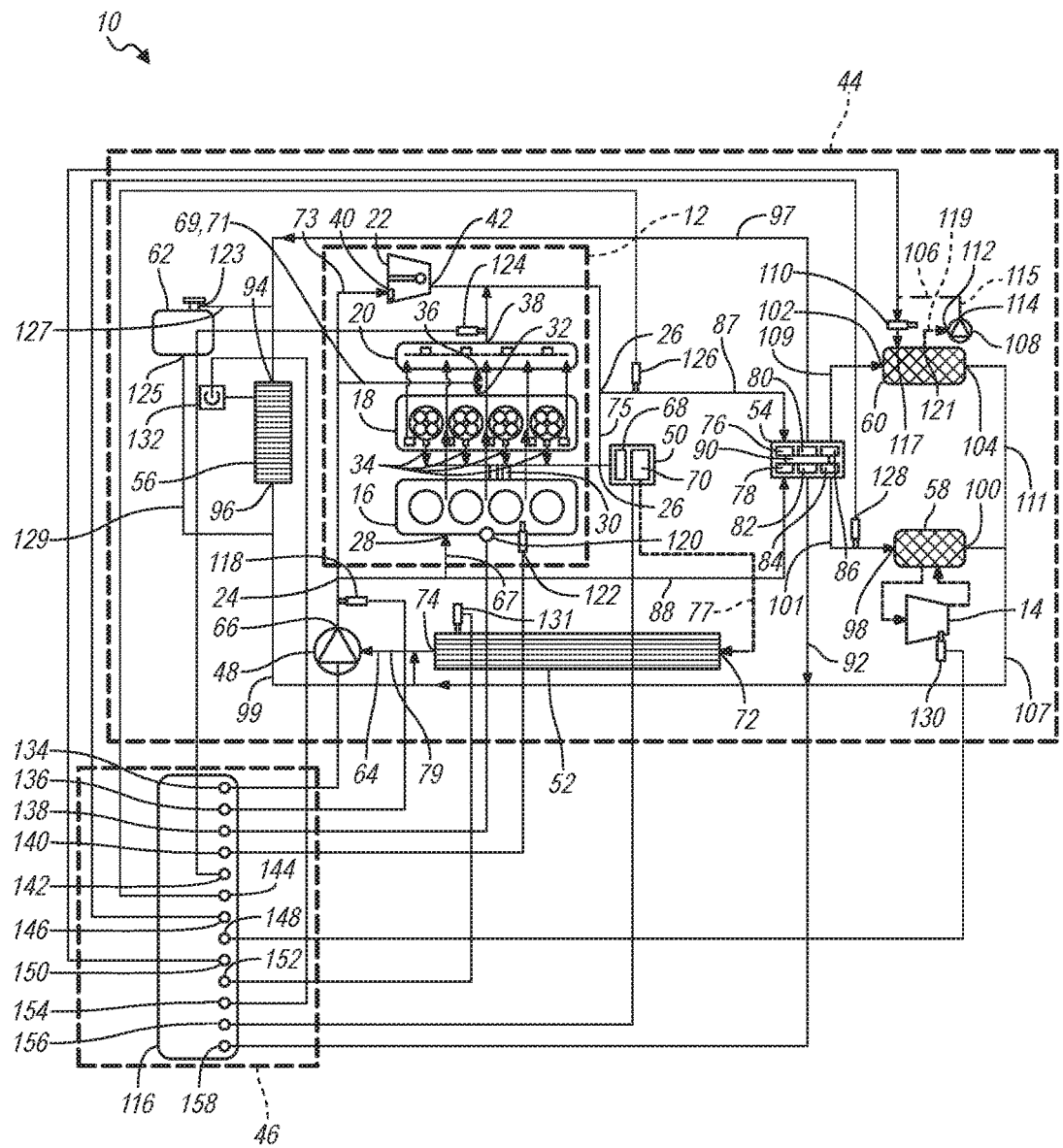
FIG. 1 is a schematic diagram of a powertrain having a thermal management system, according to the principles of the present invention.

Referring to FIG. 1, a thermal management system, generally indicated by reference number 10, for managing heat generated by a powertrain of a vehicle is illustrated. The powertrain includes an engine 12 coupled to a transmission 14. Engine 12 has an engine block 16, a cylinder head 18 an integrated exhaust manifold (IEM) 20, a turbine 22, an engine coolant inlet 24, and an engine coolant outlet 26. Engine block 16 has a block coolant inlet 28 fluidly connected to a block coolant outlet valve 30 through a plurality of coolant passages (not shown) formed in the engine block 16. The cylinder head 18 has a cylinder head coolant inlet 32 fluidly connected to a plurality of cylinder head coolant outlets 34 through a plurality of coolant passages (not shown) formed in the cylinder head 18. The IEM 20 has an IEM coolant inlet 36 fluidly connected to an IEM coolant outlet 38 through a plurality of coolant passages (not shown) formed in the IEM 20. The turbine 22 has a turbine coolant inlet 40 fluidly connected to a turbine coolant outlet 42 through a coolant passage (not shown) formed in the turbine 22.

The engine 12 may be an internal combustion engine or an electric engine, or any other type of prime mover without departing from the scope of the present disclosure. Transmission 14 may be a manual, automatic, multi-clutch, or continuously variable transmission or any other type of automotive transmission without departing from the scope of the present disclosure. The transmission 14 has a lubrication and cooling circuit (not shown) for circulating an oil throughout the transmission 14 for keeping the internal components of the transmission 14 lubricated. Moreover, the circulating oil may be used to heat or warm the transmission 14 during engine 12 startup or cool the transmission 14 as necessary during heavy use as controlled by the thermal management system 10 of the present invention. In describing the system 10 the words, "direct," and conjugations thereof, as well as "from" and "to" are used. These terms are intended to impart the concept of a flow direction. For example, when coolant or lubricating oil is "directed from A to B" the intended meaning is that coolant or lubricating oil flows from A to B, and not from B to A. Put differently, when coolant or lubricating oil is "directed from A to B", the intended meaning is that A is upstream of B in the flow of the coolant or lubricating oil.

With continuing reference to FIG. 1, thermal management system 10 includes a coolant circuit 44 controlled by an electronic control circuit 46. Coolant circuit 44 includes a coolant pump 48, a first control valve 50, a radiator 52, a second control valve 54, a heater core 56, a transmission oil heater (TOH) 58, an engine oil heater (EOH) 60 and a surge tank 62.

The coolant pump 48 has a pump inlet 64 and a pump outlet 66. The pump outlet 66 of the coolant pump 48 is directly fluidly connected to the engine block inlet 28 on the engine 12 by an engine block coolant inlet conduit 67. The coolant pump 48 directs a supply of coolant to the engine 12 via the engine block coolant inlet conduit 67. The engine 12 generates excess heat energy that is absorbed by the coolant. The pump outlet 66 of the coolant pump 48 is also directly fluidly connected to the cylinder head inlet 32 by a head coolant inlet conduit 69. The pump outlet 66 directs coolant to the cylinder head inlet 32 through the head coolant inlet conduit 69. The IEM inlet 36, and the turbine inlet 40 also receive coolant directly from the pump outlet 66 via individual conduits. Specifically, the pump outlet 66 directs coolant to the IEM inlet 36 through an IEM coolant conduit 71, and the pump outlet 66 directs coolant to the turbine inlet 40 through a turbine coolant conduit 73.

Figure 2:
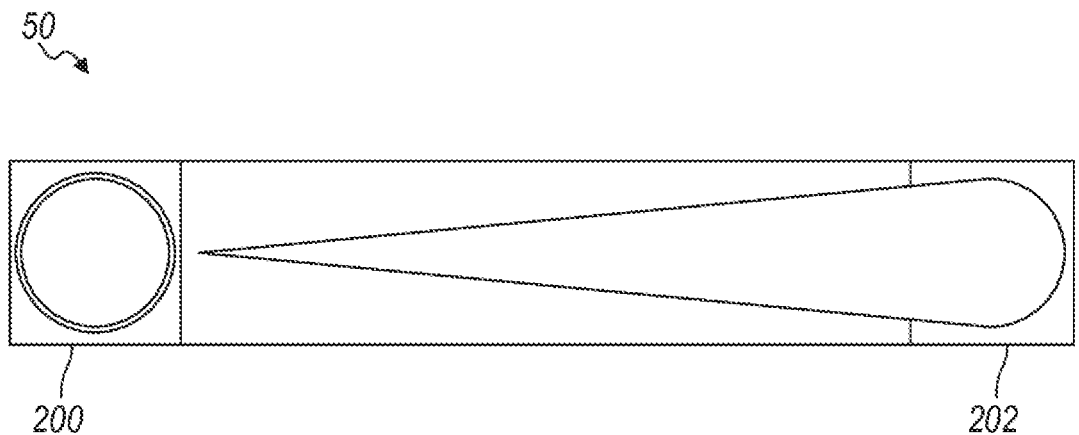
FIG. 2 is a functional diagram of a first control valve of the thermal management system, according to the principles of the present invention.

The first control valve 50 has a first control valve inlet 68 and a first control valve outlet 70. A first engine outlet coolant conduit 75 extends from the engine outlet 26 to the first control valve inlet 68. The first engine outlet coolant conduit 75 fluidly couples and communicates coolant directly from the engine outlet 26 to the first control valve inlet 68. Moreover, internally first control valve inlet 68 is in selective fluid communication with a first control valve outlet 70. As show in FIG. 2, the first control valve 50 is configured to be varied along a continuous spectrum between a fully closed state 200 to a fully opened state 202. In the fully closed state 200, the first control valve 50 prevents all coolant flow incident upon the first control valve inlet 68 to flow through the first control valve outlet 70. In the fully opened state 202, the first control valve 50 will provide all coolant flow incident upon the first control valve inlet 68 to the first control valve outlet 70. The first control valve 50 should be understood to vary the valve opening in accordance with the fluid flow demands of the engine 12, as well as the cooling requirements dictated by the optimal engine 12 component operating temperatures.

The radiator 52 has a radiator inlet 72 and a radiator outlet 74. A radiator inlet conduit 77 extends from the first control valve outlet 70 to the radiator inlet 72. The radiator inlet conduit 77 fluidly couples and communicates coolant directly from the first control valve outlet 70 to the radiator inlet 72. A radiator outlet conduit 79 extends from the radiator outlet 74 to the pump inlet 64. The radiator outlet conduit 79 fluidly couples and communicates coolant directly from the radiator outlet 74 to the pump inlet 64. The radiator 52 exchanges heat energy in the coolant with the air passing through the radiator 52, thereby expelling heat from the coolant circuit 44.

The second control valve 54 has a second control valve first inlet 76 and a second control valve second inlet 78. The second control valve 54 also has a second control valve first outlet 80, second outlet 82, third outlet 84, and fourth outlet 86. A second engine outlet coolant conduit 87 extends from the engine outlet 26 to the second control valve first inlet 76. The second engine outlet coolant conduit 87 fluidly couples and directly communicates coolant from the engine outlet 26 to second control valve first inlet 76. The second control valve first inlet 76-receives continuous fluid flow directly from the engine outlet 26 via the second engine outlet coolant conduit 87. Each of the first inlet 76, second inlet 78, first outlet 80, second outlet 82, third outlet 84, and fourth outlet 86 are actuatable between open and closed states. The second valve second inlet 78 is in fluid communication with the pump outlet 66 via an engine bypass 88. The engine bypass 88 is a conduit that fluidly couples and communicates coolant from the pump outlet 66 to the second valve second inlet 78. The second control valve 54 also has an internal partition 90 that physically separates coolant flow incident upon the second control valve first inlet 76 from coolant flow incident upon the second control valve second inlet 78. In certain powertrain operating conditions, the second valve 54 be controlled to bypass partition 90 to provide engine coolant where it can be used most effectively.

The heater core 56 has a heater core inlet 94 and a heater core outlet 96. A heater core inlet conduit 97 extends from the second control valve first outlet 80 to the heater core inlet 94. The heater core inlet conduit 97 fluidly couples and communicates coolant directly from the second control valve first outlet 80 to the heater core inlet 94. A heater core outlet conduit 99 extends from the heater core outlet 96 to the pump inlet 64, and fluidly couples the heater core outlet 96 to the pump inlet 64. The heater core outlet conduit 99 directly couples and communicates coolant from the heater core outlet 96 to the pump inlet 64. Coolant from the heater core outlet is communicated directly to the pump inlet 64 through the heater core outlet conduit 99. The heater core 56 is located in the passenger compartment of a motor vehicle and exchanges heat energy produced by the engine 12 and carried in the engine coolant with the air in the passenger compartment.

The second control valve second outlet 82 is in fluid communication with the pump inlet 64 via a radiator bypass 92. The radiator bypass 92 is a coolant conduit that extending from the second control valve second outlet 82 to the pump inlet 64. The radiator bypass 92 diverts engine coolant around the radiator 52 to prevent heat energy created by the engine 12 from escaping the coolant circuit 44.

The TOH 58 has a TOH coolant inlet 98, and a TOH coolant outlet 100. A TOH inlet conduit 101 extends from the second control valve third outlet 84 to the TOH inlet 98. The TOH inlet conduit 101 fluidly couples and directly transmits coolant from the second control valve third outlet 84 to the TOH inlet 98. A TOH outlet conduit 107 extends from the TOH outlet 100 to the pump inlet 64. The TOH outlet conduit 107 fluidly couples and communicates coolant directly from the TOH outlet 100 to the pump inlet 64. The TOH 58 is a heat exchange device attached to the transmission 14. The TOH 58 has physically separate coolant and transmission oil passageways. Heat energy produced by the engine 12 and carried in the engine coolant is carried to the TOH 58. Heat energy produced by the transmission 14 and carried by the transmission oil is also carried into the TOH 58. Separate engine coolant and transmission oil passageways (not shown) in the TOH 58 allow engine coolant and transmission oil to exchange heat energy with one another without coming into physical contact.

The EOH 60 has an EOH coolant inlet 102, and an EOH coolant outlet 104. An EOH inlet conduit 109 extends directly from the second control valve fourth outlet 86 to the EOH inlet 102. The EOH inlet conduit 109 fluidly couples and communicates coolant directly from the second control valve fourth outlet 86 to the EOH inlet 102. An EOH outlet conduit 111 extends directly from the EOH outlet 104 to the pump inlet 64. The EOH outlet conduit 111 fluidly couples and communicates coolant directly from the EOH outlet 104 to the pump inlet 64. The EOH 60 is a heat exchange device attached to the engine 12, and has physically separate coolant and transmission oil passageways (not shown). In the EOH 60, the engine coolant and engine oil exchange heat energy with one another without coming into physical contact.

The EOH 60 also has an engine oil circuit 106 including an engine oil pump 108, and an engine oil temperature sensor 110. The engine oil pump 108 has an oil pump inlet 112, and an oil pump outlet 114. The engine oil pump 108 receives engine oil from the engine 12 via the oil pump inlet 112. The engine oil pump 108 communicates the engine oil from the oil pump inlet 112 to the oil pump outlet 114. A oil pump outlet conduit 115 extends from the oil pump outlet 114 to an EOH oil inlet 117. The oil pump outlet conduit 115 fluidly couples and communicates oil directly from the oil pump outlet 114 to the EOH oil inlet 117. A oil pump inlet conduit 119 extends from an EOH oil outlet 121 to the oil pump inlet 112. The oil pump inlet conduit 119 fluidly couples and communicates oil directly from the EOH oil pump outlet 121 to the oil pump inlet 112. The engine oil temperature sensor 110 is disposed in the oil pump outlet conduit 115 between the oil pump outlet 114 and the EOH oil inlet 117.

The surge tank 62 has a surge tank inlet 123 and a surge tank outlet 125. An surge tank inlet conduit 127 extends from the second control valve first outlet 80 to the surge tank inlet 123. The surge tank inlet conduit 127 fluidly couples and communicates coolant directly from the second control valve first outlet 80 to the surge tank inlet 123. A twelfth coolant conduit 129 extends directly from the surge tank outlet 125 to the pump inlet 64. The twelfth coolant conduit 129 fluidly couples and communicates coolant directly from the surge tank outlet 125 to the pump inlet 64. The surge tank provides flow and thermal relief for the coolant circuit 44. If coolant flow rates or temperatures exceed predetermined thresholds, excess coolant is temporarily diverted into the surge tank via the surge tank inlet conduit 127 to prevent the coolant circuit 44 from becoming over-pressurized.

With further reference to the thermal management system 10 of FIG. 1, the cooling circuit 44 is controlled by the electronic control system 46. The electronic control system 46 includes an ECM 116, an engine block heater 120 and a plurality of sensors. The plurality of sensors includes an engine coolant inlet temperature sensor 118, an engine block temperature sensor 122, an IEM temperature sensor 124, an engine outlet temperature sensor 126, a transmission coolant flow sensor 128, a transmission oil temperature sensor 130, the engine oil temperature sensor 110, a radiator temperature sensor 131, and a heater core power switch sensor 132.

The ECM 116 utilizes control logic implemented in either software or hardware to control the operation of the block heater 120, the first valve 50, and the second valve 54. This control logic requires ECM input data from the plurality of sensors of the electronic control system 46, and the ECM 116 sends output commands to the block heater 120, the first valve 50, and the second valve 54. The ECM 116 has a first ECM port 134, a second ECM port 136, a third ECM port 138, a fourth ECM port 140, a fifth ECM port 142, a sixth ECM port 144, a seventh ECM port 146, an eighth ECM port 148, a ninth ECM port 150, a tenth ECM port 152, an eleventh ECM port 154, a twelfth ECM port 156, and a thirteenth ECM port 158.

The first ECM port 134 is in electronic communication with the coolant pump 48, and controls the operation of the coolant pump 48. The coolant pump 48 pressurizes engine coolant and drives the engine coolant through the coolant circuit 44. The second ECM port 136 is in electronic communication with the engine coolant inlet temperature sensor 118. The engine coolant inlet temperature sensor 118 is disposed between the coolant pump outlet 66 and the engine coolant inlet 24 on the engine block coolant inlet conduit 67. The engine coolant temperature sensor 118 monitors engine inlet coolant temperature and provides engine inlet coolant temperature data to the ECM 116. The third ECM port 138 is in electronic communication with the engine block heater 120. The engine block heater 120 is disposed on the engine block 16. The ECM 116 controls the operation of the engine block heater 120. The block heater 120 is a thermal apparatus that provides heat to the engine block 16. The block heater 120 is used, particularly in extremely cold ambient conditions, to raise the temperature of the engine oil and coolant to increase lubricity and reduce damage to the engine 12 during start-up. The fourth ECM port 140 is in electronic communication with the engine block temperature sensor 122. The engine block temperature sensor 122 is disposed on the engine block 16. The engine block temperature sensor 122 monitors engine block temperature and provides engine block temperature data to the ECM 116. The fifth ECM port 142 is in electronic communication with the IEM temperature sensor 124. The IEM temperature sensor 124 is disposed between the IEM outlet 38 and the engine coolant outlet 26. The IEM temperature sensor 124 monitors IEM coolant temperature and provides IEM temperature data to the ECM 116. The sixth ECM port 144 is in electronic communication with the engine outlet temperature sensor 126. The engine outlet temperature sensor 126 is disposed between the engine outlet 26 and the second valve first inlet 76 on the second engine outlet coolant conduit 87. The engine outlet temperature sensor 126 monitors engine outlet coolant temperature and provides engine outlet coolant temperature data to the ECM 116. The seventh ECM port 146 is in electronic communication with the transmission coolant flow sensor 128. The transmission coolant flow sensor 128 is disposed between the second valve third outlet 84 and the TOH inlet 98 on the TOH inlet conduit 101. The transmission coolant flow sensor 128 monitors transmission coolant flow rate and provides transmission coolant flow rate data to the ECM 116. The eighth ECM port 148 is in electronic communication with the transmission oil temperature sensor 130. The transmission oil temperature sensor 130 is disposed on the transmission 14. The transmission oil temperature sensor 130 monitors the transmission oil temperature and provides transmission oil temperature data to the ECM 116. The ninth ECM port 150 is in electronic communication with the engine oil temperature sensor 110. The engine oil temperature sensor 110 is disposed within the engine oil heating circuit 106, between the oil pump outlet 112 and the EOH oil inlet 103 on the oil pump outlet conduit 115. The engine oil temperature sensor 110 monitors engine oil temperature and provides engine oil temperature data to the ECM 116.

The tenth ECM port 152 is in electronic communication with the radiator temperature sensor 131. The radiator temperature sensor 131 is disposed on the radiator 52. The radiator temperature sensor 131 monitors radiator coolant temperature and provides radiator coolant temperature data to the ECM 116

The eleventh ECM port 154 is in electronic communication with the heater core power switch sensor 132. The heater core power switch sensor 132 is disposed on the heater core 56. The heater core power switch sensor 132 is in electronic communication with the heater core 56. The heater core 56 has an active state and an inactive state. In the active state, coolant flows through the heater core 56. In the inactive state, no coolant flows through the heater core 56. The heater core power switch sensor 132 provides heater core 56 activity information to the ECM 116. The twelfth ECM port 156 is in electronic communication with the first valve 50, and controls the first valve 50 operating position. The thirteenth ECM port 158 is in electronic communication with the second valve 54 and controls the second valve 54 operating position.

Figure 3:
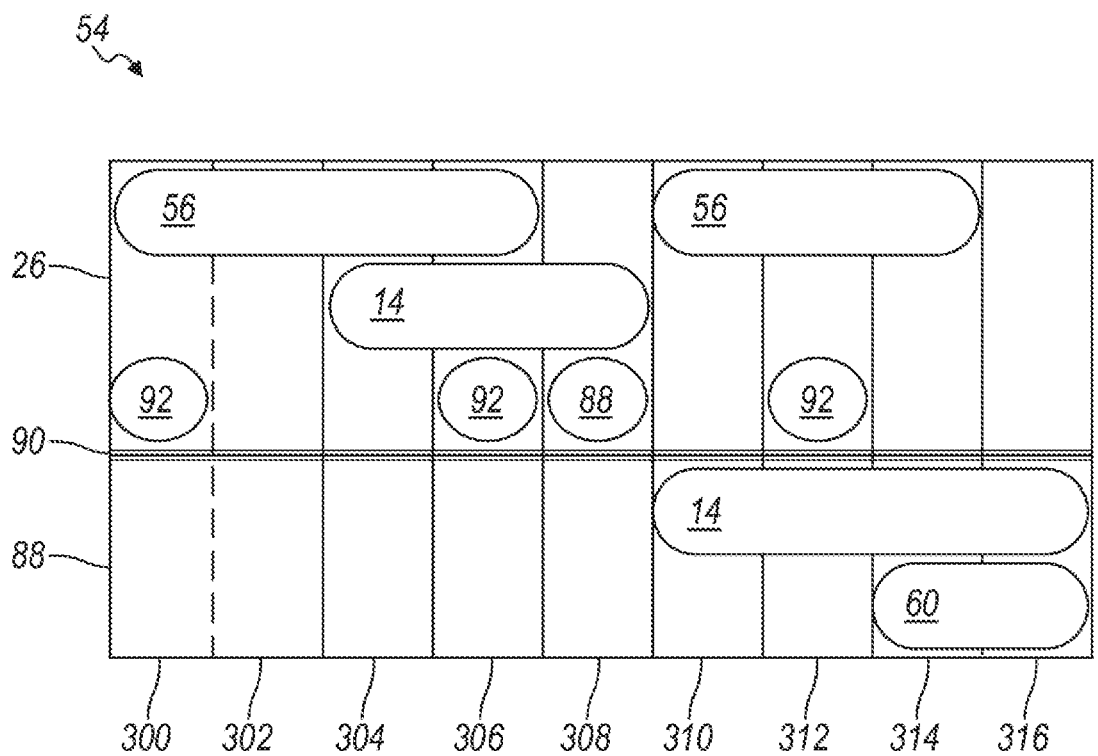
FIG. 3 is a functional state diagram of a second control valve of the thermal management system, according to the principles of the present invention.

Turning now to FIG. 3, a state diagram depicting the operation of the second control valve 54 is shown. The second control valve 54 has a plurality of operating states. In FIG. 3, the second control states are depicted by the vertically oriented sections of the diagram numbered 300, 302, 304, 306, 308, 310, 312, 314, and 316. Additionally, the second control valve 54 may be separated into two distinct sections not in fluid communication with one another. The first distinct region is defined by the engine coolant outlet 26. In this region, coolant flows from the engine coolant outlet 26 into the second valve first inlet 76. The second distinct region is defined by the engine bypass 88. In this region, coolant flows from the engine bypass 88 into the second valve second inlet 78. The separation is achieved by a physical partition 90 within the second control valve 54.

In the first state 300, the second control valve first inlet 76, the second control valve first outlet 80, and the second control valve second outlet 82 are in an open state, and coolant is allowed to flow from the first inlet 76 to the first and second outlets 80, 82. The second control valve first outlet 80 communicates coolant to heater core inlet 94 via the heater core inlet conduit 97. The second control valve second outlet 82 communicates coolant to pump inlet 64. All other outlets of the second valve 54 remain closed. In the first state 300, the second control valve 54 is positioned to maximize coolant flow to the heater core 56 by operating the coolant pump 48 at higher flow rates in extreme cold temperatures and directing coolant through the radiator bypass 92.

In the second state 302, the second control valve first inlet 76 and the second control valve first outlet 80 are in an open state allowing coolant to flow from the first inlet 76 to first outlet 80. The second control valve first outlet 80 communicates coolant to the heater core inlet 94 via the heater core inlet conduit 97. All other outlets of the second valve 54 remain closed. In the second state 302, the second control valve 54 is operable to direct maximum coolant flow to the heater core 56.

In the third state 304, the second control valve first inlet 76, the second valve first outlet 80, and the second valve third outlet 84 are in open states. In the third state 304, the second control valve first outlet 80 communicates coolant to the heater core inlet 94 via the heater core inlet conduit 97, and the second control valve third outlet 84 communicates coolant to the TOH inlet 98 via the TOH inlet conduit 101. All other outlets of the second valve 54 remain closed. In the third state 304, the second control valve 54 directs engine thermal energy in the coolant to the heater core 56 and the TOH 58.

In the fourth state 306, the second control valve first inlet 76, the second valve first outlet 80, the second control valve second outlet 82, and the second control valve third outlet 84 are in an open state. In the fourth state 306, the second control valve first outlet 80 communicates coolant to the heater core inlet 94 via the heater core inlet conduit 97, and the second control valve second outlet 82 communicates coolant to the pump inlet 64 via the radiator bypass 92. In addition, the second control valve third outlet 84 communicates coolant to the TOH inlet 98 via the TOH inlet conduit 101. In the fourth state 306, with maximum engine power being required, the heater core 56 is in an on/active position, and maximum coolant flow is also required of the coolant circuit 44. In the fourth state 306, engine coolant is communicated to the heater core 56 to provide heat to the passenger compartment. Engine coolant is also communicated to the TOH 58 to rapidly warm the transmission 14, while the radiator bypass 92 is activated to relieve extreme flow pressure on the TOH 58.

In a fifth state 308, the second valve first inlet 76, and second valve second inlet 78 are in an open state. The second valve third outlet 84 is also in an open state. Moreover, in the fifth state 308, the second valve partition 90 is internally bypassed within the second valve 54 so that coolant from both the first inlet 76 and second inlet 78 of the second valve 54 is communicated to the second valve third outlet 84. In the fifth state 308, the second valve third outlet 84 communicates coolant to the TOH inlet 98 via the TOH inlet conduit 101. In the fifth state 308 a maximum amount of engine coolant is directed through the TOH 58 by activating the engine bypass 88.

In the sixth state 310, the second valve first inlet 76 and second valve second inlet 78 are in an open state. The second valve first outlet 80, and third outlet 84 are also in an open state. In the sixth state 310, the engine outlet 26 communicates coolant to the second valve first inlet 76 via first engine outlet coolant conduit 75, and the coolant pump outlet 66 communicates coolant to the second control valve second inlet 78 via the engine bypass 88. In addition, the second valve first outlet 80 communicates coolant to the heater core inlet 94 via heater core inlet conduit 97, and the second valve third outlet 84 communicates coolant to the TOH inlet 98 via TOH inlet conduit 101. In the sixth state 310, the transmission 14 is already at or above a predetermined temperature threshold, so the engine bypass 88 is activated to provide cooler engine-input coolant to the transmission 14 to provide a cooling effect.

In a seventh state 312, the second valve first inlet 76 and the second valve second inlet 78 are in an open state. The second valve first 80, second 82, and third 84 outlets are also in an open state. In the seventh state 312, the engine outlet 26 communicates coolant to the second valve first inlet 76 via first engine outlet coolant conduit 75, and the coolant pump outlet 66 communicates coolant to the second control valve second inlet 78 via the engine bypass 88. In addition, the second valve first outlet 80 communicates coolant to the heater core inlet 94 via heater core inlet conduit 97, the second valve second outlet 82 communicates coolant to the coolant pump inlet 64 via the radiator bypass 92, and the second valve third outlet 84 communicates coolant to the TOH inlet 98 via TOH inlet conduit 101. In the seventh state 312, the engine 12 is below a threshold operating temperature, and maximum power is being required of the engine 12. Additionally, the heater core 56 is in an on/active position, and the transmission 14 is below a predetermined temperature threshold, so the engine bypass 88 is activated to provide as much heated engine-input coolant as possible to the heater core 56, and transmission 14 without losing heat energy via the radiator 52 to the atmosphere. In the seventh state 312 the engine 12 is under heavy load and requires a maximum amount of cooling capacity while the heater core 56 is also enabled. When in the seventh state 312, the thermal management system 10 operates to provide as much coolant as possible to the heater core 56 and to the TOH 58 to rapidly raise the temperatures of the passenger compartment, and transmission 14.

In an eighth state 314, the second valve first inlet 76 and the second valve second inlet 78 are in an open state. The second valve first 80, third 84, and fourth 86 outlets are also in an open state. In the eighth state 314, the engine outlet 26 communicates coolant to the second valve first inlet 76 via second engine outlet coolant conduit 87, and the coolant pump outlet 66 communicates coolant to the second control valve second inlet 78 via the engine bypass 88. In addition, the second valve first outlet 80 communicates coolant to the heater core inlet 94 via heater core inlet conduit 97, the second valve third outlet 84 communicates coolant to the TOH inlet 98 via TOH inlet conduit 101, and the second valve fourth outlet 86 communicates coolant to the EOH inlet 102 via EOH inlet conduit 109. In the eighth state 314, the engine 12 is above a predetermined temperature threshold and is under heavy load. In the eighth state 314, the engine 12 requires a maximum amount of cooling capacity while the heater core 56 is also enabled. Therefore, the thermal management system 10 operates to provide as much coolant flow to the EOH 60, TOH 58, and heater core 56 as possible while also allowing some coolant to be diverted through the radiator 52 if the flow demands on the TOH 58 exceed a predetermined threshold value.

In a ninth state 316, the second valve second inlet 78 is in an open state. The second valve third 84 and fourth 86 outlets are also in an open state. In the ninth state 316 the pump outlet 66 communicates coolant to the second valve second inlet 78 via the engine bypass 88. The second control valve third outlet 84 communicates coolant to the TOH inlet 98 via TOH inlet conduit 101, and the second control valve fourth outlet 86 communicates coolant to the EOH inlet 102 via EOH inlet conduit 109. In the ninth state, the engine 12 is under heavy load, and the engine 12 requires a maximum amount of cooling capacity. In the ninth state 316, coolant is directed through the EOH 60 and TOH 58 as well as through the radiator 52.

Figure 4:
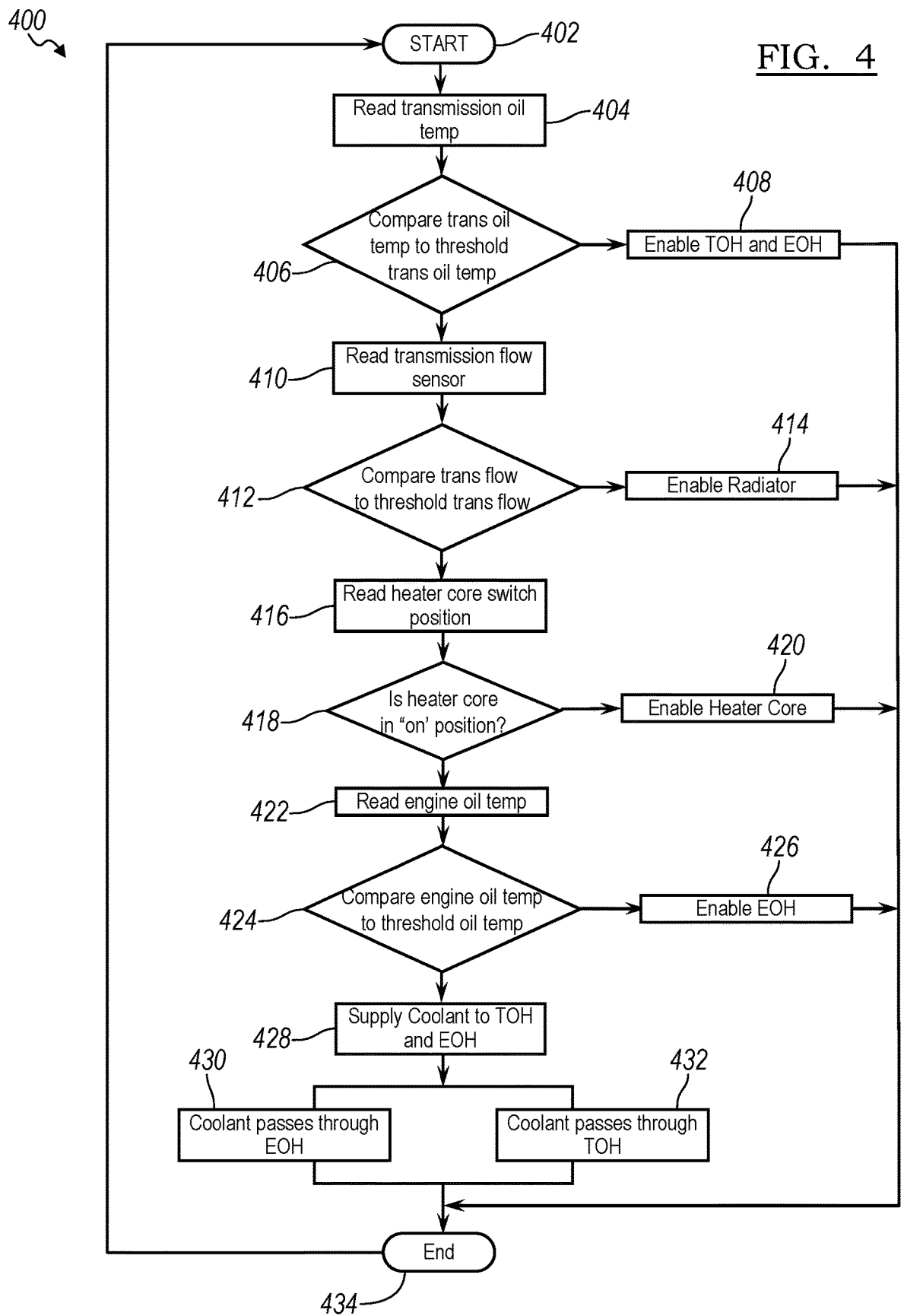
FIG. 4 is a flow diagram of illustrating a method of operation of the thermal management system, according to the principles of the present invention.

Turning now to FIG. 4, a method 400 for managing thermal energy in a powertrain in accordance with the present invention is shown in flowchart form. When the exemplary thermal management system is enabled, a continuous transmission warming loop, is used to rapidly bring the transmission 14 to optimal operating temperature to achieve optimum efficiency within the powertrain.

The exemplary method 400 begins at block 402. At block 404, the ECM 116 reads the transmission oil temperature sensor 130. The ECM 116 compares the transmission oil temperature reading to a predetermined threshold temperature value at block 406. If the ECM 116 determines that the threshold value is exceeded, then the method proceeds to block 408. At block 408 the TOH 58 and EOH 60 are enabled. The TOH 58 and EOH 60 are enabled by activating the flow passageway between the second control valve third outlet 84 and the TOH inlet 98, as well as by activating the second control valve fourth outlet 86 to the EOH inlet 102. This increases thermal energy flow from the engine coolant to the engine oil heating circuit 106 and to the transmission oil without passing through the radiator 52 or other heat exchangers in the system.

If, however, the ECM 116 determines that the transmission oil temperature has not reached the threshold value, the ECM 116 takes a reading from the transmission flow sensor 128 at block 410. The ECM 116 compares the transmission flow value to a predetermined threshold value at block 412. If the ECM 116 determines that the threshold value is exceeded, the method proceeds to block 414. At block 414 the radiator 52 is enabled by activating a flow path between the engine outlet 26 through the first control valve first inlet 68 to the first control valve first outlet 70 and the radiator inlet 72. Activating the flow path between the first control valve first outlet 70 and the radiator inlet 72 allows some of the coolant to bypass the transmission 14 and prevents potentially damaging coolant oversupply.

If, however, the ECM 116 determines that the transmission flow rate has not exceeded the threshold value, the ECM 116 takes a reading from the heater core switch sensor 132 at block 416. At block 418, if the ECM 116 determines that the heater core switch sensor 132 has determined that the heater core 56 is in the "on" position, the method proceeds to block 420. At block 420 the heater core 56 is activated by enabling the second coolant control valve second outlet 80 to allow flow to the heater core inlet 94. In this state, some of the thermal energy in the engine coolant is radiated into the passenger compartment and otherwise lost to the thermal management system 10.

If, however, the ECM 116 determines that the heater core 56 is in the "off" position, the ECM 116 takes a reading from the engine oil temperature sensor 110 at block 422. At block 424, the ECM 116 compares the engine oil temperature to a predetermined threshold engine oil temperature value. If the ECM 116 determines that the engine oil temperature value has exceeded the threshold value, the method proceeds to block 426. At block 426, the EOH 60 is enabled by activating the coolant flow passageway between the second coolant control valve fourth outlet 86 and the EOH inlet 102. This aids in preventing the engine 12 from overheating or otherwise operating outside of the most thermally efficient temperature range.

If, however, the ECM 116 determines that the engine oil temperature has not exceeded the threshold value, the ECM 116 directs the first coolant control valve 50 to supply as much coolant as possible to the second coolant control valve 54 by partially or completely closing off the first coolant valve outlet 70 at block 428. In addition, at block 428, the ECM 116 directs the second coolant control valve 54 to supply coolant to both the TOH 58 and EOH 60 to provide optimal thermal exchange between the engine coolant and the transmission oil and engine oil respectively.

Once the coolant has passed through the EOH 60 and TOH 58 at block 430 and block 432, or when one of the other conditions at blocks 408, 414, 420, or 426 has been achieved, the thermal management system 10 exits the method at block 434 and returns to block 402 where the ECM 116 continually reassesses the method 400.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for managing heat energy in a vehicle powertrain, the system comprising:
    an engine producing heat energy in the vehicle powertrain, the engine having at least one engine coolant inlet, a first engine coolant outlet, and a second engine coolant outlet;
    a pump for supplying coolant to the engine, the pump having a pump inlet and a pump outlet, wherein the pump outlet communicates coolant directly to the at least one engine coolant inlet at an engine block of the engine;
    a first control valve having a first control valve inlet and a first control valve outlet, wherein the first engine coolant outlet communicates coolant directly to the first control valve inlet;
    a radiator having a radiator coolant inlet and a radiator coolant outlet, wherein the first control valve outlet communicates coolant directly to the radiator coolant inlet, and the radiator coolant outlet communicates coolant directly to the pump inlet;
    a second control valve having a first inlet, a second inlet, a first outlet, a second outlet, a third outlet, and a fourth outlet, wherein the second engine coolant outlet communicates coolant directly to the first inlet of the second control valve, and the pump outlet communicates coolant directly to the second inlet of the second control valve via an engine bypass;
    a heater core having a heater core inlet and a heater core outlet, wherein the heater core outlet communicates coolant directly to the pump inlet, the first outlet of the second control valve communicates coolant directly to the heater core inlet, and the second outlet of the second control valve communicates coolant directly to the pump inlet via a radiator bypass;
    a transmission oil heat exchanger for exchanging heat energy between coolant and transmission oil of a transmission, the transmission oil heat exchanger having a transmission oil heat exchanger inlet and a transmission oil heat exchanger outlet, wherein the third outlet of the second control valve communicates coolant directly to the transmission oil heat exchanger inlet, and the transmission oil heat exchanger outlet communicates coolant directly to the pump inlet; and
    an engine oil heat exchanger for exchanging heat energy between coolant and engine oil of the engine, the engine oil heat exchanger having an engine oil heat exchanger inlet and an engine oil heat exchanger outlet, wherein the fourth outlet of the second control valve communicates coolant directly to the engine oil heat exchanger inlet, and the engine oil heat exchanger outlet communicates coolant directly to the pump inlet,
    wherein the heat energy produced by the engine is managed via controlling the first control valve and the second control valve, and transferring the heat energy to at least one of the radiator, the heater core, the transmission oil heat exchanger, and the engine oil heat exchanger.

2. The system of claim 1, wherein the first control valve is a variable flow valve that is capable of regulating an amount of coolant flow flowing from the first control valve inlet to the first control valve outlet.

3. The system of claim 1, wherein the second control valve further comprises a first operating state, wherein in the first operating state, coolant is directed from the first inlet of the second control valve to the first outlet of the second control valve and the second outlet of the second control valve.

4. The system of claim 3, wherein the second control valve further comprises a second operating state, wherein in the second operating state, coolant is directed from the first inlet of the second control valve to only the first outlet of the second control valve.

5. The system of claim 4, wherein the second control valve further comprises a third operating state, wherein in the third operating state, coolant is directed from the first inlet of the second control valve to the first outlet of the second control valve and the third outlet of the second control valve.

6. The system of claim 5, wherein the second control valve further comprises a fourth operating state, wherein in the fourth operating state, coolant is directed from the first inlet of the second control valve to the first outlet of the second control valve, the second outlet of the second control valve, and the third outlet of the second control valve.

7. The system of claim 6, wherein the second control valve further comprises a fifth operating state, wherein in the fifth operating state, coolant is directed from the first and second inlets of the second control valve to the third outlet of the second control valve.

8. The system of claim 7, wherein the second control valve further comprises a sixth operating state, wherein in the sixth operating state, coolant is directed from the first and second inlets of the second control valve to the first outlet of the second control valve and the third outlet of the second control valve.

9. The system of claim 8, wherein the second control valve further comprises a seventh operating state, wherein in the seventh operating state, coolant is directed from the first and second inlets of the second control valve to the first outlet of the second control valve, the second outlet of the second control valve, and the third outlet of the second control valve.

10. The system of claim 9, wherein the second control valve further comprises an eighth operating state, wherein in the eighth operating state, coolant is directed from the first and second inlets of the second control valve to the first outlet of the second control valve, the third outlet of the second control valve, and the fourth outlet of the second control valve.

11. The system of claim 10, wherein the second control valve further comprises a ninth operating state, wherein in the ninth operating state, coolant is directed from only the second inlet of the second control valve to only the third outlet of the second control valve and the fourth outlet of the second control valve.

12. A method for managing heat energy in a vehicle powertrain, the method comprising:
producing heat energy using an engine of the vehicle powertrain, the engine having at least one engine coolant inlet, a first engine coolant outlet, and a second engine coolant outlet;
supplying coolant to the engine using a pump, the pump having a pump inlet and a pump outlet, wherein the pump outlet communicates coolant directly to the at least one engine coolant inlet at an engine block of the engine;
controlling coolant flow with a first control valve, the first control valve having a first control valve inlet and a first control valve outlet, wherein the first engine coolant outlet communicates coolant directly to the first control valve inlet;
releasing heat energy from coolant by passing coolant through a radiator, the radiator having a radiator coolant inlet and a radiator coolant outlet, wherein the first control valve outlet communicates coolant directly to the radiator coolant inlet, and the radiator coolant outlet communicates coolant directly to the pump inlet;
controlling coolant flow with a second control valve, the second control valve having a first inlet, a second inlet, a first outlet, a second outlet, a third outlet, and a fourth outlet, wherein the second engine coolant outlet communicates coolant directly to the first inlet of the second control valve, and the pump outlet communicates coolant directly to the second inlet of the second control valve via an engine bypass;
releasing heat energy from coolant by passing coolant through a heater core, the heater core having a heater core inlet and a heater core outlet, wherein the heater core outlet communicates coolant directly to the pump inlet, the first outlet of the second control valve communicates coolant directly to the heater core inlet, and the second outlet of the second control valve communicates coolant directly to the pump inlet via a radiator bypass;
exchanging heat energy between coolant and transmission oil of a transmission using a transmission oil heat exchanger, the transmission oil heat exchanger having a transmission oil heat exchanger inlet and a transmission oil heat exchanger outlet, wherein the third outlet of the second control valve communicates coolant directly to the transmission oil heat exchanger inlet, and the transmission oil heat exchanger outlet communicates coolant directly to the pump inlet;
exchanging heat energy between coolant and engine oil of the engine using an engine oil heat exchanger, the engine oil heat exchanger having an engine oil heat exchanger inlet and an engine oil heat exchanger outlet, wherein the fourth outlet of the second control valve communicates coolant directly to the engine oil heat exchanger inlet, and the engine oil heat exchanger outlet communicates coolant directly to the pump inlet; and
transferring the heat energy produced using the engine to at least one of the radiator, the heater core, the transmission oil heat exchanger, and the engine oil heat exchanger via controlling the first control valve and the second control valve.

13. The method of claim 12, wherein the first control valve is a variable flow valve, and wherein controlling coolant flow further comprises regulating an amount of coolant flow flowing from the first control valve inlet to the first control valve outlet.

14. The method of claim 12, wherein controlling coolant flow further comprises directing coolant from the first inlet of the second control valve to the first outlet of the second control valve and the second outlet of the second control valve in a first operating state of the second control valve.

15. The method of claim 14, wherein controlling coolant flow further comprises directing coolant from the first inlet of the second control valve to only the first outlet of the second control valve in a second operating state of the second control valve.

16. The method of claim 15, wherein controlling coolant flow further comprises directing coolant flow from the first inlet of the second control valve to the first outlet of the second control valve and the third outlet of the second control valve in a third operating state of the second control valve.

17. The method of claim 16, wherein controlling coolant flow further comprises directing coolant flow from the first inlet of the second control valve to the first outlet of the second control valve, the second outlet of the second control valve, and the third outlet of the second control valve in a fourth operating state of the second control valve.

18. The method of claim 17, wherein controlling coolant flow further comprises directing coolant flow from the first and second inlets of the second control valve to the third outlet of the second control valve in a fifth operating state of the second control valve.

19. The method of claim 18, wherein controlling coolant flow further comprises directing coolant flow from the first and second inlets of the second control valve to the first outlet of the second control valve and the third outlet of the second control valve in a sixth operating state of the second control valve.

20. The method of claim 19, wherein controlling coolant flow further comprises directing coolant flow from the first and second inlets of the second control valve to the first outlet of the second control valve, the second outlet of the second control valve, and the third outlet of the second control valve in a seventh operating state of the second control valve.

21. The method of claim 20, wherein controlling coolant flow further comprises directing coolant flow from the first and second inlets of the second control valve to the first outlet of the second control valve, the third outlet of the second control valve, and the fourth outlet of the second control valve in an eighth operating state of the second control valve.

22. The method of claim 21, wherein controlling coolant flow further comprises directing coolant flow from only the second inlet of the second control valve to only the third outlet of the second control valve and the fourth outlet of the second control valve in a ninth operating state of the second control valve.

* * * * *